Patented May 28, 1929.

1,715,261

UNITED STATES PATENT OFFICE.

MAX WEILER, OF LEVERKUSEN-ON-THE-RHINE, GERMANY, ASSIGNOR TO GRASELLI DYESTUFF CORPORATION, OF NEW YORK, N. Y., A CORPORATION OF DELAWARE.

DYESTUFFS OF THE PYRONE SERIES AND PROCESS OF MAKING THE SAME.

No Drawing. Application filed June 2, 1927, Serial No. 196,144, and in Germany July 8, 1926.

This invention relates to improvements in the manufacture and production of dyestuffs of the pyrone series.

In United States Patent No. 1,532,790 there are described dyestuff products obtained by condensing 2.4-dihydroxy-benzoic acid compounds or their mixtures, in strong sulfuric acid, with aromatic aldehydes substituted in ortho-position to the carbonyl group, or such aldehydes as contain neither substituents in ortho-position nor an hydroxy group in ortho- or para-position to the carbinol carbon atom, pouring the resulting melts onto ice, and oxidizing the resulting separated leuco compounds, respectively sulfonating these leuco compounds or the dyestuffs themselves in the usual manner. The resulting products are, after being dried and pulverized, generally red to yellow to greenish black powders, generally only slightly soluble in water, but easily soluble in water after sulfonation. They are generally easily soluble in dilute caustic soda solution with a yellow to red coloration. These products dye wool from acid baths from yellow-orange to red and after chroming from red-orange to brown-red shades fast to alkali, fulling and potting. Said products contain dyestuffs which have most probably the following general formula:

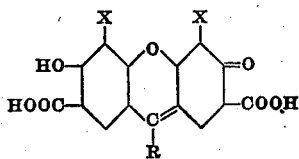

wherein X represents hydrogen or an alkyl group and R represents an aromatic nucleus which may be substituted.

It has been observed that the aforesaid dyestuff products generally yield dull shades having a brownish discoloration.

The object of the present invention is to provide a method of producing from the above-described starting materials dyestuffs similar to those described and capable of yielding clearer, purer shades (i. e., shades free from discoloration).

It has now been found that, when practicing the process disclosed in U. S. Patent No. 1,532,790, objectionable by-products, i. e., secondary dyestuff products, are formed in conjunction with the principal dyestuffs and remain in the finished product, and that the dulling and discoloration of the resulting dyeings are directly attributable to said secondary dyestuff products.

A particular object of the present invention, therefore, is to provide a method or procedure whereby the aforesaid principal dyestuffs may be separated in a substantially pure state from said secondary dyestuff products.

In accordance with the present invention the pyrone dyestuff acids as they are obtained following the process described in U. S. Patent No. 1,532,790, viz, by pouring the melts (i. e., condensation reaction mixtures containing an excess of strong sulfuric acid) onto ice, are separated from other, usually browner, dyestuffs generally present as by-products, in the melts in substantial amounts by converting said mixture of dyestuff acids into suitable salts (e. g., sodium salts) thereof and separating the difficultly soluble salts of the pure pyrone dyestuffs from the more easily soluble salts of said secondary dyestuff products. The said difficultly soluble salts correspond most probably to the general formula

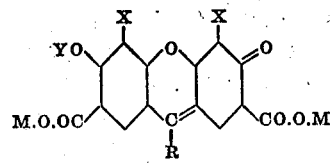

wherein X represents a substituent of the group hydrogen and alkyl, Y represents a substituent of the group hydrogen and alkali metal, M represents an alkali metal and R represents an aromatic nucleus which may be substituted. After the elimination of these secondary dyestuff products the resulting purified pyrone dyestuff salts dye the fiber in clearer purer shades than can be obtained from the crude dyestuff acids.

The following examples will serve to illustrate the invention:

*Example 1.*

The acid product obtained, as described in Example 1 of the U. S. Patent No. 1,532,790, from 15 parts by weight of 2.6-dichlorbenzaldehyde and 28 parts by weight of 2.4-dihydroxy-3-methylbenzoic acid, is dissolved in sodium carbonate solution and treated with common salt until no further precipitation of the sodium salt of the purified pyrone dyestuff having most probably the formula:

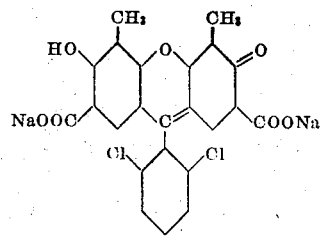

takes place. The resulting precipitate, after being separated from the filtrate, dried and pulverized, is found to be a dark red powder difficultly soluble in water, easily soluble in caustic soda solution or sodium carbonate solution with a scarlet coloration and a strong fluorescence, soluble in concentrated sulfuric acid with a yellow solution. It dyes wool, from an acid bath, clear, pure scarlet shades essentially clearer than the shades obtained from the corresponding crude product; when after treated with chrome-mordants they are changed to a clear, intense purple shade.

The filtrate from the above described sodium salt, on being precipitated by means of mineral acid, yields a brown dyestuff acid which dyes wool from an acid bath brown shades which, upon subsequent chroming, become more intense reddish-brown.

The dyestuffs obtained from the said 2.4-dihydroxy-3-methylbenzoic acid and benzaldehyde or ortho- or meta- monochlorobenzaldehyde behave in a similar manner.

The salts of the sulfonated pyrone dyestuff acids are, for the most part, very difficult to salt out. The pyrone dyestuff from 2-chloro-5-sulfo-benzaldehyde for example can only be salted out as the potassium salt by the addition of a large excess of potassium carbonate. In the case of other sulfonated pyrone dyestuff acids the calcium, barium or lead salts are employed for the separation from the more soluble secondary dyestuff products.

*Example 2.*

The same quantity of the said dyestuff acid as in Example 1 is first converted, by the addition of sodium carbonate, into the neutral sodium salt. Without separation of the latter, 47 parts by weight of 30% caustic soda solution are added and subsequently common salt, whereupon there is precipitated a basic sodium salt of the purified pyrone dyestuff having most probably the formula

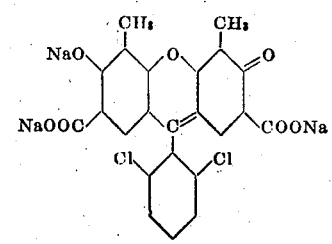

The resulting precipitate is, after separation from the filtrate, drying and pulverizing, a dark red powder which is considerably more readily soluble in water than the neutral sodium salt described in Example 1. Dyeings upon wool with the said basic sodium salt of the purified pyrone dyestuff show shades of the same clearness and purity as obtained in the case of the corresponding neutral salt.

From the alkaline filtrate mineral acid separates the same brown dyestuff as described in Example 1.

It is to be understood that the above-described procedure is equally applicable in the case of all other pyrone dyestuff melts obtained from 2.4-dihydroxybenzoic acid compounds, or mixtures thereof, and aromatic aldehydes substituted in ortho-position to the carbonyl group or such aldehydes as contain neither substituents in ortho-position nor an hydroxyl group in ortho- or para-position to the carbinol carbon atom.

It is to understood that the hydrogen atom of the hydroxyl group may be substituted by an alkali metal, particularly when the neutral alkali metal salt is treated, according to the procedure illustrated in Example 2, with an alkali metal hydroxide.

I claim:

1. Method of producing a substantially pure pyrone dyestuff from the dyestuff product obtained by condensing a 2.4-dihydroxybenzoic acid compound with an aromatic aldehyde, pouring the resulting melt onto ice, and treating the resulting leuco acid products with an oxidizing agent, whereby there are produced in admixture a principal pyrone dyestuff and a dyestuff by-product, which consists in converting the said dyestuff product into suitable metal salts and separating the difficultly soluble metal salts of the said principal pyrone dyestuff having most probably the general formula:

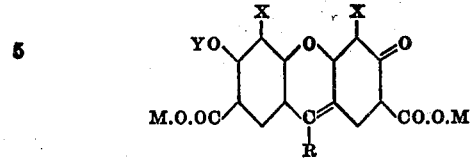

wherein X represents a substituent of the group hydrogen and alkyl, Y represents a substituent of the group hydrogen and alkali metal, M represents an alkali metal, and R represents an aromatic nucleus which may be substituted, from the more readily soluble metal salts of the said dyestuff by-product.

2. Method of producing a substantially pure pyrone dyestuff from the dyestuff product obtained by condensing 2.4-dihydroxy-3-methyl-benzoic acid with 2.6-dichlorbenzaldehyde in the presence of concentrated sulfuric acid, pouring the resulting melt onto ice, and treating the resulting leuco acid products with an oxidizing agent, whereby there are produced in admixture a principal pyrone dyestuff and a dyestuff by-product, which consists in converting the said dyestuff product into suitable metal salts and separating the difficultly soluble metal salt of the said principal pyrone dyestuff having most probably the formula

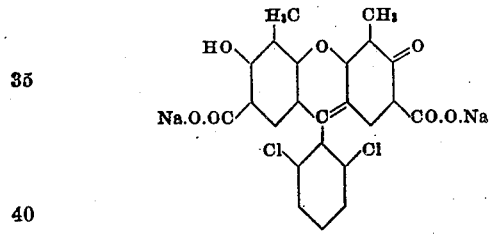

from the more readily soluble metal salt of the dyestuff by-product.

3. As new products compounds having probably the general formula:

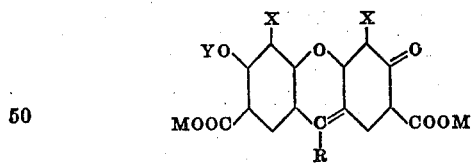

wherein X represents a substituent of the group comprising hydrogen and alkyl, Y represents a substituent of the group comprising hydrogen and an alkali metal, M represents an alkali metal, and R represents an aromatic nucleus which may be substituted, said compounds being substantially free from the metal salts of dyestuff by-products.

4. As a new product the compound of the probable formula:

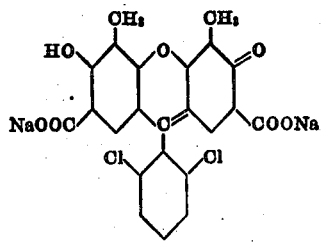

being substantially free from dyestuff by-products.

5. A new product comprising a compound having most probably the formula:

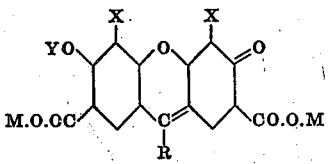

wherein X represents a substituent of the group comprising hydrogen and alkyl, Y represents a substituent of the group hydrogen and alkali metal, M represents an alkali metal, and R represents an aromatic nucleus which may be substituted, said product being substantially free from a metal salt of a dyestuff by-product which is present in the dyestuff product obtained by condensing a 2.4-dihydroxy-benzoic acid compound with an aromatic aldehyde, pouring the resulting melt onto ice, and treating the resulting leuco acid products with an oxidizing agent.

6. A new product comprising a compound having most probably the formula:

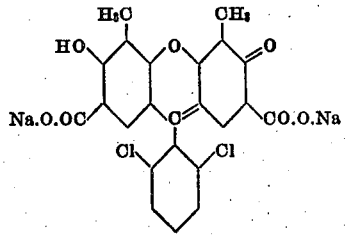

said product being substantially free from a metal salt of a dyestuff by-product which is present in the dyestuff product obtained by condensing 2.4-dihydroxy-3-methyl-benzoic acid with 2.6-dichlorbenzaldehyde in the presence of concentrated sulfuric acid, pouring the resulting melt onto ice, and treating the resulting leuco acid products with an oxidizing agent.

In testimony whereof, I affix my signature.

MAX WEILER.